(12) United States Patent
Gedela

(10) Patent No.: US 10,529,500 B2
(45) Date of Patent: Jan. 7, 2020

(54) METHOD FOR MAKING COMPOSITE MATERIALS AND FLEXIBLE SUPERCAPACITOR DEVICES

(71) Applicant: Nanospan India Private Limited, Hyderabad (IN)

(72) Inventor: Venkataramana Gedela, Srikakulam (IN)

(*) Notice: Subject to any disclaimer, the term of this patent is extended or adjusted under 35 U.S.C. 154(b) by 0 days.

(21) Appl. No.: 16/055,195

(22) Filed: Aug. 6, 2018

(65) Prior Publication Data

US 2019/0057819 A1    Feb. 21, 2019

(30) Foreign Application Priority Data

Aug. 17, 2017  (IN) .............................. 201741029166

(51) Int. Cl.

| | |
|---|---|
| *H01G 11/86* | (2013.01) |
| *H01G 11/48* | (2013.01) |
| *H01G 11/02* | (2013.01) |
| *H01G 11/24* | (2013.01) |
| *H01G 11/56* | (2013.01) |
| *H01G 11/26* | (2013.01) |
| *C01B 32/225* | (2017.01) |
| *C01B 32/192* | (2017.01) |
| *H01G 11/36* | (2013.01) |
| *B82Y 30/00* | (2011.01) |
| *B82Y 40/00* | (2011.01) |

(52) U.S. Cl.
CPC ........... *H01G 11/86* (2013.01); *C01B 32/192* (2017.08); *C01B 32/225* (2017.08); *H01G 11/02* (2013.01); *H01G 11/24* (2013.01); *H01G 11/26* (2013.01); *H01G 11/36* (2013.01); *H01G 11/48* (2013.01); *H01G 11/56* (2013.01); *B82Y 30/00* (2013.01); *B82Y 40/00* (2013.01)

(58) Field of Classification Search
CPC ........ H01G 11/48; H01G 11/02; H01G 11/24; H01G 11/26; H01G 11/36; H01G 11/56; H01G 11/86; C01B 32/225; C01B 32/192; B82Y 30/00; B82Y 40/00
See application file for complete search history.

(56) References Cited

U.S. PATENT DOCUMENTS

| | | | | | |
|---|---|---|---|---|---|
| 1,137,373 | A | * | 4/1915 | Aylsworth | ............ C04B 35/536 |
| | | | | | 252/511 |
| 1,191,383 | A | * | 7/1916 | Aylsworth | ............ C04B 35/536 |
| | | | | | 252/378 R |
| 3,404,061 | A | * | 10/1968 | Bochman | ................ C04B 20/06 |
| | | | | | 428/143 |

(Continued)

*Primary Examiner* — Scott B Geyer

(57) ABSTRACT

The present invention provides a method (201) for making composite materials used in making flexible supercapacitor prototype (106). The method (201) comprises the steps of rolling the exfoliated graphite (101) using rolling instrument (103) to form an EG sheet (104). In-situ coating is done on EG sheet (104) to form flexible EG or polymer electrode which is used to make supercapacitors (106). A graphite powder (101) is added with the mixture of $HNO_3$ and $H_2SO_4$ in the ratio of 1:3 resulting in oxidized graphite. Oxidized graphite undergoes thermal shock in an isothermal furnace at a temperature of 900 degree Celsius for time duration of 2 minutes resulting in EG worms (102). These EG worms are rolled using a rolling instrument (103) to form an EG sheet (104).

6 Claims, 2 Drawing Sheets

(56) References Cited

U.S. PATENT DOCUMENTS

| | | | | |
|---|---|---|---|---|
| 4,895,713 | A * | 1/1990 | Greinke | C04B 35/536 |
| | | | | 252/502 |
| 9,437,372 | B1 * | 9/2016 | Zhamu | C04B 35/52 |
| 9,601,805 | B2 * | 3/2017 | He | H01M 10/0566 |
| 2014/0147648 | A1 * | 5/2014 | Zhamu | C30B 5/00 |
| | | | | 428/220 |
| 2014/0308517 | A1 * | 10/2014 | Zhamu | D01F 9/12 |
| | | | | 428/367 |
| 2015/0037530 | A1 * | 2/2015 | Zhamu | D01F 9/12 |
| | | | | 428/113 |
| 2015/0038041 | A1 * | 2/2015 | Zhamu | D03D 15/0088 |
| | | | | 442/195 |
| 2015/0086881 | A1 * | 3/2015 | Zhamu | H01G 11/68 |
| | | | | 429/405 |
| 2019/0051466 | A1 * | 2/2019 | Zhamu | H01G 11/10 |

\* cited by examiner

METHOD FOR MAKING COMPOSITE MATERIALS AND FLEXIBLE SUPERCAPACITOR DEVICES

DESCRIPTION OF THE INVENTION

Technical Field of the Invention

The present invention relates to the field of graphene or conductive polymer composite based micro supercapacitors having higher energy density used in applications such as power banks as energy storage devices or power sources in microelectronic devices.

Background of the Invention

Some of the methods for making supercapacitor devices using composite materials are defined in the literature. Most of the methods employed for making supercapacitor devices using composite materials produce supercapacitors having low energy density and their application is thus still limited in terms of specific energy.

Supercapacitors as one of the energy storage devices exhibit ultrahigh capacitance, high power density and long cycle. High specific area, mechanical and chemical stability and low cost are often required for supercapacitor materials.

Various prior art methods have been used to produce supercapacitor devices using composite materials. These supercapacitor devices produced are not capable enough to withstand high voltage. Moreover, their production cost is also on the higher side and their scalability in industry is currently narrowing the application options because energy efficiency is negated against cost efficiency.

Hence, there is a need for a method to produce flexible electrode materials with high specific capacitance for making advanced flexible supercapacitors. These materials can be used in applications such as power banks as energy storage devices and wearable electronics. For these purposes, polymeric materials combined with electrically conductive fillers can be used. However, in order to obtain high electrical conductivity, it may be necessary to load the polymeric materials with high levels of filler material. Yet it has proved difficult to achieve high filler loadings of nanomaterials in the polymer matrix. One problem associated with high filling levels is that the mechanical or physical properties of the nanomaterials reinforced material may be compromised or adversely affected. For example—the brittleness of the resulting composite material may increase to potentially unacceptable levels.

Hence there exists a need of high filler loadings of nanomaterials in the polymer matrix without compromising the mechanical or physical properties of the nanomaterials reinforced material with high filling levels.

SUMMARY OF THE INVENTION

The present invention overcomes the drawbacks in the prior art and provides a method for making flexible supercapacitor devices. This method involves use of high specific capacitive composite materials comprising a polyaniline nanofiber conducting polymer and a filler nanomaterial in the form of graphene nanosheets for making prototype of flexible supercapacitor's device.

The present invention provides a simple and cost-effective method for making high specific capacitive composite materials for making flexible supercapacitor devices.

It is to be understood that both the foregoing general description and the following details description are exemplary and explanatory and are intended to provide further explanation of the invention as claimed.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

The present invention provides a method for developing flexible supercapacitor prototypes using Nano composite materials. The present fabrication methods enable the on-chip integration of microelectronic devices and therefore provide an opportunity for the development of a variety of micro or Nano sized energy devices.

The invention relates to high specific capacitive composite materials comprising polyaniline nanofibers conducting polymer and a filler nanomaterial and methods of making the composite materials. The invention further relates to compositions formed in the method and their use in various applications such as manufacturing the composite materials and the use of said compositions and composite materials in flexible electrodes which are used in supercapacitors. The present composite materials used as electrodes for making advanced supercapacitor device are metal free, binder free and flexible.

Recent developments in miniaturized electronic devices has increased the demand for power sources that are sufficiently compact and can potentially be integrated on a chip with other electronic components. This involves fabricating all solid state MSCs (Micro Supercapacitors) using a laser for patterning of substrates such as exfoliated graphene sheets coated with 3-D graphene or polyaniline nanofibers to produce in-plane inter digitized microelectrodes for use in conjuction with gel state electrolytes. The present Micro Supercapacitors exhibit outstanding cycling stability when compared to the existing prior art methods by using ionic gel that present high thermal stability.

Figure 1:
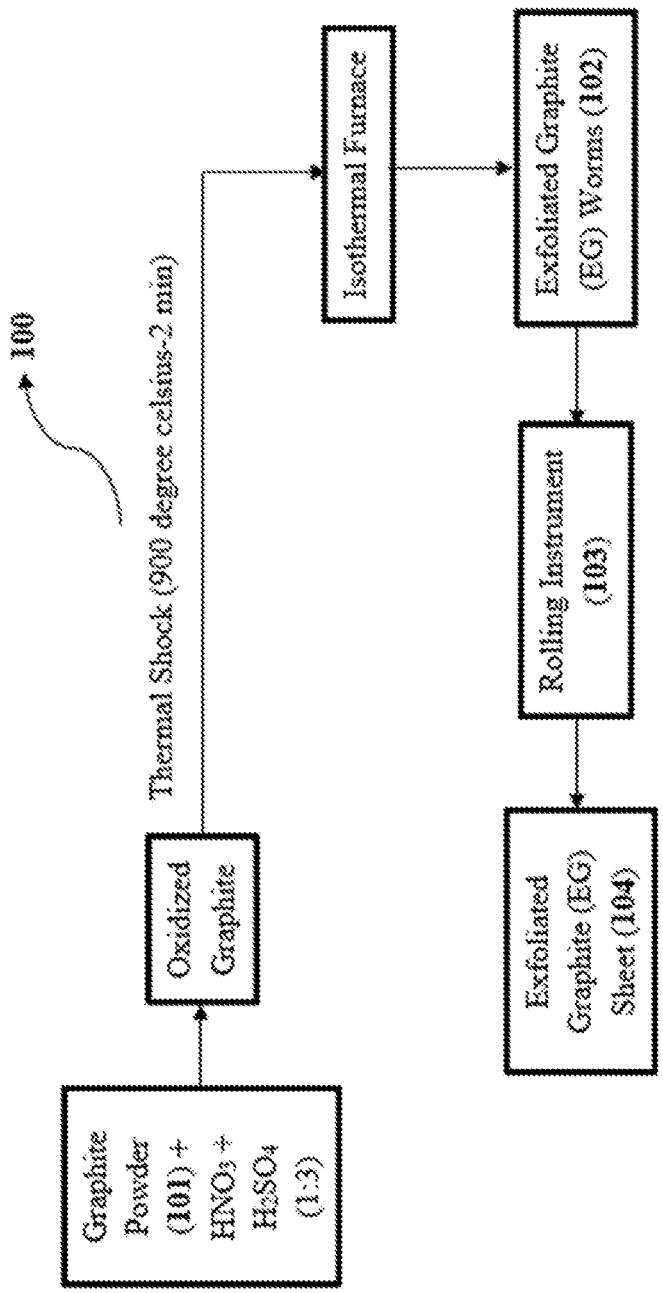
FIG. 1 illustrates the block diagram of the Exfoliated Graphite (EG) sheet fabrication method for obtaining EG sheet according to one embodiment of the present invention.

FIG. 1 shows EG sheet fabrication method (100) which comprises the steps of addition of graphite powder (101) with a mixture of $HNO_3$ (Nitric Acid) and $H_2SO_4$ (Sulfuric Acid) in the ratio of 1:3 to form an oxidized graphite which undergoes a thermal shock in an isothermal furnace at a temperature of 900 degree Celsius for a time duration of two minutes. This results in Exfoliated Graphite Worms (102) which undergo rolling process in a rolling instrument (103) to form an EG sheet (104).

Figure 2:
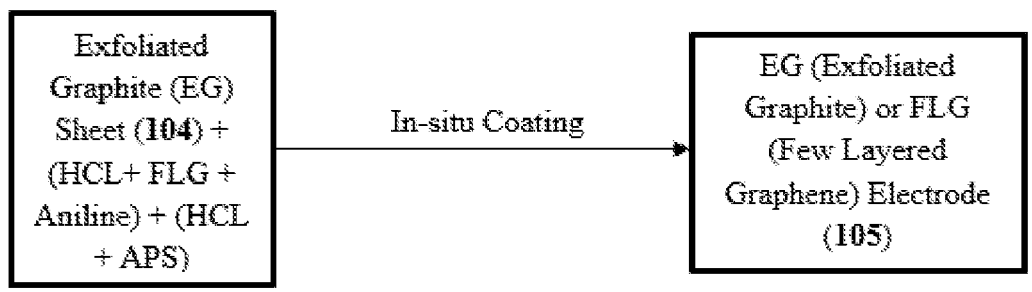
FIG. 2 illustrates the steps involved in producing EG electrodes using in-situ coating process according to one embodiment of the present invention.

FIG. 2 shows in-situ coating process on EG electrodes which involves addition of EG sheet (104) with the two mixtures; one mixture containing HCL (Hydrochloric Acid), Few Layered Graphene (FLG) and Aniline and another mixture containing HCL and APS (Ammonium Peroxy Disulfate) to form in-situ coated EG electrode (105).

Figure 3:
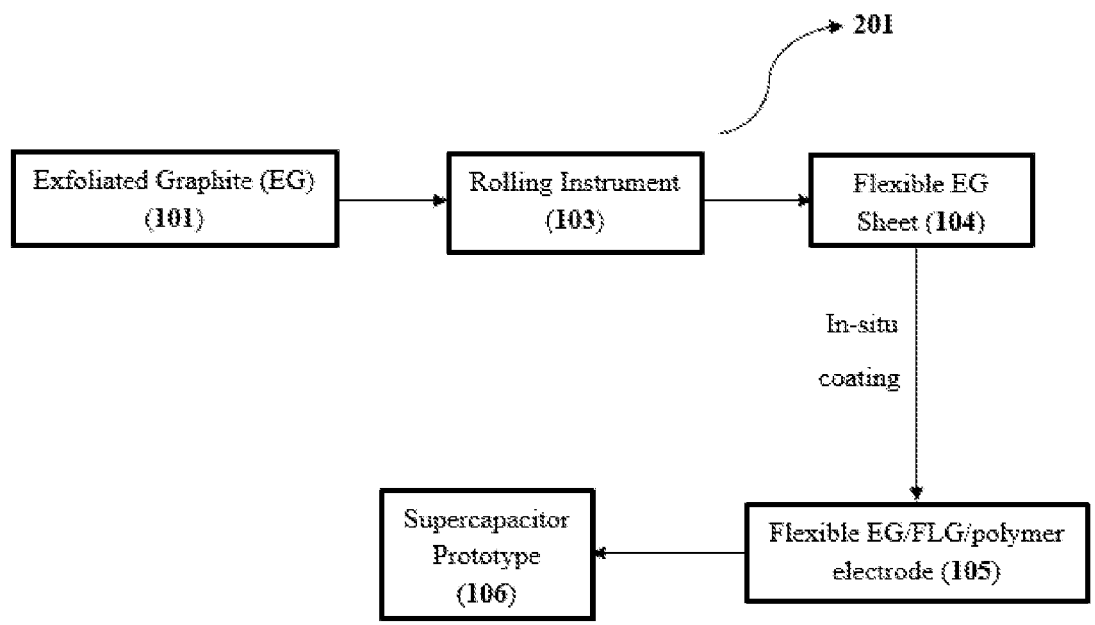
FIG. 3 illustrates the supercapacitor fabrication process used for obtaining supercapacitor prototype according to one embodiment of the present invention.

FIG. 3 shows a method (201) which comprises of an exfoliated graphite (101) converted in the form of an EG sheet (104) with the help of a rolling instrument (103) where the EG (101) undergoes rolling process. The EG sheet (104) formed undergoes in-situ polymerization resulting in a flexible EG electrodes (105) which are metal and binder free in nature. These electrodes (105) are used to achieve the final supercapacitor prototype (106).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for fabricating a 3-D graphene and conducting polymer composites based electrode, the method comprising the steps of:
    adding graphite powder with a mixture of nitric acid and sulfuric acid in the ratio of 1:3 to form oxidized graphite;
    giving a thermal shock to the oxidized graphite in an isothermal furnace to form exfoliated graphite worms;
    rolling the exfoliated graphite worms using a rolling instrument, thereby forming an Exfoliated Graphite (EG) sheet; and
    coating the EG sheet, with 3-D graphene and polyaniline nanofibers composite to produce in-plane inter digitized microelectrodes on the EG sheet, for use in conjunction with gel-state electrolytes, thereby forming the polymer electrode.

2. The method as claimed in claim 1, wherein the oxidized graphite undergoes the thermal shock at a temperature of about 900-degree Celsius for a time duration of about 2 minutes.

3. The method as claimed in claim 1, wherein the coating of the EG sheet comprises adding the EG sheet with two mixtures, one mixture containing HCl (Hydrochloric Acid), FLG (Few Layered Graphene) and Aniline, and another mixture containing HCl and APS (Ammonium Peroxy Disulfate).

4. The method as claimed in claim 3, wherein the coating of the EG sheet is done using an in-situ polymerization process.

5. The method as claimed in claim 1, wherein the polyaniline nanofibers form a matrix on the EG sheet and the 3-D graphene acts as filler of the matrix.

6. A method for supercapacitor fabrication, the method comprising, obtaining the 3-D graphene and conducting polymer composites based electrode using the steps of claim 1, and using the electrode to make a supercapacitor device.

* * * * *